(12) United States Patent
Lee et al.

(10) Patent No.: US 8,463,108 B2
(45) Date of Patent: Jun. 11, 2013

(54) CLIENT-SIDE AD INSERTION DURING TRICK MODE PLAYBACK

(75) Inventors: Victor S. Lee, Cupertino, CA (US); Pradip K. Fatehpuria, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 856 days.

(21) Appl. No.: 12/349,339

(22) Filed: Jan. 6, 2009

(65) Prior Publication Data

US 2010/0172625 A1    Jul. 8, 2010

(51) Int. Cl.
*H04N 9/80* (2006.01)
*H04N 5/783* (2006.01)

(52) U.S. Cl.
USPC ........... 386/249; 386/239; 386/248; 386/343; 386/350; 386/351

(58) Field of Classification Search
USPC .................. 386/248–251, 343–352
See application file for complete search history.

(56) References Cited

U.S. PATENT DOCUMENTS

| | | | |
|---|---|---|---|
| 5,377,051 A | 12/1994 | Lane et al. | |
| 6,871,006 B1 | 3/2005 | Oguz et al. | |
| 7,023,924 B1 | 4/2006 | Keller et al. | |
| 7,096,488 B1 | 8/2006 | Zhang et al. | |
| 7,106,749 B1 | 9/2006 | Darshan et al. | |
| 2002/0174438 A1 | 11/2002 | Cleary et al. | |
| 2002/0196714 A1* | 12/2002 | Tada et al. | 369/30.12 |
| 2003/0093790 A1 | 5/2003 | Logan et al. | |
| 2003/0147561 A1 | 8/2003 | Faibish et al. | |
| 2004/0003398 A1* | 1/2004 | Donian et al. | 725/34 |
| 2005/0141853 A1* | 6/2005 | Takemura | 386/46 |
| 2006/0013557 A1* | 1/2006 | Poslinski | 386/46 |
| 2006/0146780 A1 | 7/2006 | Paves | |
| 2006/0222321 A1 | 10/2006 | Russ | |
| 2006/0225105 A1 | 10/2006 | Russ | |
| 2006/0253864 A1* | 11/2006 | Easty | 725/35 |
| 2007/0022459 A1 | 1/2007 | Gaebel et al. | |
| 2008/0056682 A1 | 3/2008 | Minnick et al. | |
| 2008/0152300 A1* | 6/2008 | Knee et al. | 386/68 |
| 2008/0187279 A1* | 8/2008 | Gilley et al. | 386/52 |
| 2008/0260352 A1* | 10/2008 | Turner | 386/95 |

OTHER PUBLICATIONS

"Sun Microsystems documentation ", retrieved at <<http://docs.sun.com/app/docs/doc/805-4360/6j44oq1gu? a=view>>, Oct. 20, 2008, pp. 1-3.
"Content input specification ", retrieved at <<http://sunsolve.sun.com/data/802/802-3804/encode_spec.doc. html#506>>, Oct. 20, 2008, pp. 1-13.
"Society of Cable Telecommunications Engineers", American National Standard ANSI/SCTE 35 2007, Digital Program Insertion Cueing Message for Cable, 2007, 42 pages.

* cited by examiner

*Primary Examiner* — Thai Tran
*Assistant Examiner* — Hung Dang
(74) *Attorney, Agent, or Firm* — Wolfe-SBMC

(57) ABSTRACT

A device plays back programming content in a trick mode while an advertising segment record is monitored. When an advertising segment beginning identified by the advertising segment record is encountered, playback of the programming content temporarily ceases. One or more advertisements are played back during the advertising segment, and then playback of the programming content in the trick mode resumes after an ending of the advertising segment is encountered.

18 Claims, 6 Drawing Sheets

CLIENT-SIDE AD INSERTION DURING TRICK MODE PLAYBACK

BACKGROUND

Current video playback systems typically allow consumers to rewind or fast-forward through television programming and other audio/video content. This fast-forwarding and rewinding can be performed at different speeds, and is also oftentimes referred to as trick mode playback. However, playing back content using a trick mode can result in situations where the time or location for an advertisement is skipped over. This can be problematic as it can result in situations where some advertisements that are supposed to be played back are not actually played back.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, programming content is played back in a trick mode while an advertising segment record is monitored. When an advertising segment beginning identified by the advertising segment record is encountered, playback of the programming content ceases. One or more advertisements are played back during the advertising segment, and playback of the programming content in the trick mode resumes after an ending of the advertising segment is encountered.

BRIEF DESCRIPTION OF THE DRAWINGS

The same numbers are used throughout the drawings to reference like features.

DETAILED DESCRIPTION

Client-side ad insertion during trick mode playback is discussed herein. During playback of audio/video content, advertisements are played back during advertising segments interspersed among programming content segments. The device playing back the content maintains a record that identifies when the advertising segments occur, and the device monitors this record during playback of the audio/video content in trick modes. During playback of the programming content in a trick mode, when the time for an advertising segment occurs playback of the programming content ceases while one or more advertisements are played back. After the one or more advertisements are played back, playback of the programming content in the trick mode resumes.

Figure 1:
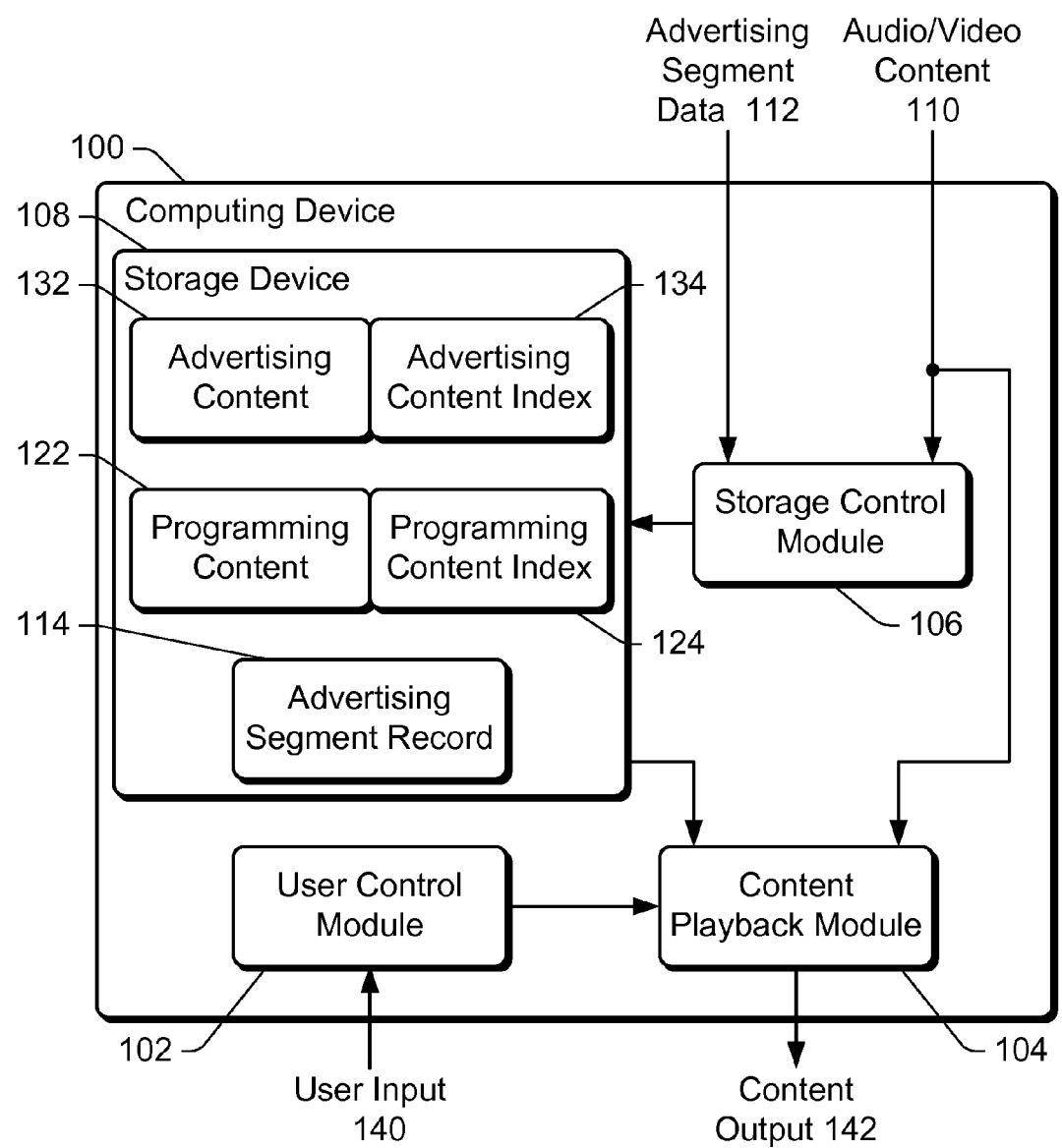
FIG. 1 illustrates an example computing device implementing the client-side ad insertion during trick mode playback in accordance with one or more embodiments.

FIG. 1 illustrates an example computing device 100 implementing the client-side ad insertion during trick mode playback in accordance with one or more embodiments. Computing device 100 can be any of a variety of devices that output audio/video content for playback. For example, device 100 can be a computer, such as a desktop computer or a server computer, a handheld computer or personal digital assistant (PDA), a mobile station, an entertainment appliance, a set-top box communicatively coupled to a display device, a video playback device (e.g., digital video recorder (DVR), digital versatile disk (DVD) player, etc.), a television, a cell or other wireless phone, a game console, an automotive PC, and so forth. Thus, device 100 can range from full resource devices with substantial memory and processor resources (e.g., personal computers, game consoles, etc.) to low-resource devices with limited memory and/or processing resources (e.g., traditional set-top boxes, hand-held game consoles, DVD players, etc.).

Computing device 100 includes a user control module 102, a content playback module 104, a storage control module 106, and a storage device 108. Storage control module 106 receives audio/video content 110 and can store the received content 110 in storage device 108. Storage device 108 can be a variety of different storage devices, such as an optical disc, hard drive, flash memory device, and so forth. Additionally, storage device 108 can be implemented as part of computing device 108, or alternatively can be a removable device or a remote storage device (e.g., accessed via a network). Content playback module 104 plays back the received content from storage device 108, or alternatively plays back audio/video content 110 as content 110 is received.

Audio/video content 110 can be any audio/video content that can be communicated to device 100. Examples of such audio/video content include video on demand (VOD) programs, previously recorded programs, live programs and/or channels, advertisements, and so forth. Audio/video content 110 can be a variety of different programs or shows, such as movies, sitcoms, commercials, news broadcasts, documentaries, sporting events, and so forth. Audio/video content 110 can be received in any of a variety of manners, such as via wired or wireless transmission media, from a disc (e.g., optical or magnetic) or other physical media, and so forth.

Audio/video content 110 includes programming content and optionally advertising content. Programming content refers to programs or shows as discussed above. Advertising content refers to advertisements (ads) that are played back to the user, typically during advertising segments interspersed among programming segments during which the programming content is played back.

In one or more embodiments, the programming content and advertising content are received from different sources. For example, advertising content can be obtained from a different channel or server than the programming content, advertising content can be received on a disc or other media separate from the programming content, advertising content can be previously downloaded and stored by device 100 for subsequent playback during an advertising segment, and so forth. In such embodiments, indications of when advertising segments occur during the programming content are used to playback the ads at appropriate times rather than the programming content, as discussed in more detail below. Alternatively, the programming content and advertising content can be received from the same source. For example, both the programming content and advertising content can be broadcast or otherwise communicated to device 100 via a particular television channel (e.g., with the advertising content being interspersed among sections of the programming content).

Content playback module 104 also receives advertising segment data 112. Advertising segment data 112 identifies when advertising segments occur during the programming content of audio/video content 110. Advertising segment data 112 includes an indication of a beginning time and an ending time of the advertising segment, or alternatively a beginning time and a duration. Alternatively, a duration of the advertising segment may be previously defined or otherwise known, in which case advertising segment data 112 need only identify the beginning of the advertising segment and the duration and/or ending time of the advertising segment can be assumed.

In one or more embodiments, advertising segment data 112 is received as part of audio/video content 110, and is a signal or indication in the programming content of an upcoming advertising segment. The signal or indication can include an identification of when an upcoming advertising segment occurs, or alternatively the timing of the upcoming advertising segment can be inherent in the signal or indicator (e.g., the signal or indicator may be defined according to a particular standard as being embedded in the programming content an amount of time (such as 6 or 8 seconds) before the advertising segment. An example of such a signal is a signal in accordance with the SCTE-35 standard ("Digital Program Insertion Cueing Message for Cable", American National Standard, Society of Cable Telecommunications Engineers ANSI/SCTE 35 2007).

The timing of when advertising segments occur during the programming content of audio/video content 110 can alternatively be identified in other manners. For example, advertising segment data 112 can be a separate table or other record of when advertising segments occur that is obtained by device 100 from a server or other device. Alternatively, an indication of when advertising segments occur can be generated by storage control module 106 (or alternatively another component, module, or device) based on a particular set of rules or an algorithm.

Storage control module 106 stores an advertising segment record 114 in storage device 108. Advertising segment record 114 can be generated based on advertising segment data 112, or alternatively advertising segment data 112 can be stored as advertising segment record 114. For example, storage control module 106 can monitor signals of when advertising segments occur, these signals being embedded in the programming content of audio/video content 110 as discussed above. These signals are used to identify when the advertising segments for the programming content occur, and storage control module 106 stores an identification of when the advertising segments occur as advertising segment record 114. Alternatively, advertising segment record 114 can be pre-generated and sent to or otherwise obtained by storage control module 106 as advertising segment data 112.

Storage control module 106 can also store programming content 122 and advertising content 132. Programming content 122 can be received as audio/video content 110 and stored by module 106 for later playback by content playback module 104. Programming content 122 is one or more programs (or portions thereof) that can be played back by computing device 100. Similarly, advertising content 132 can be received as audio/video content 110 and stored by module 106 for later playback by content playback module 104. Advertising content 132 is one or more advertisements (or portions thereof) that can be played back by computing device 100. Local storage of ads in storage device 108 allows the ads to be inserted into the content output 142 by module 104 rather than being incorporated into audio/video content 110 prior to being received by device 100. This insertion of ads into content output 142 by device 104 is also referred to as client-side ad insertion due to its being performed by the device doing the playback of the content.

Additionally, programming content 122 has a corresponding programming content index 124. Index 124 can be embedded in programming content 122 (such as in a header of content 122), can be included in a file corresponding to content 122, or can otherwise be associated with content 122. Index 124 can be pre-generated and sent to or otherwise obtained by storage control module 106, such as embedded in audio/video content 110. Alternatively, index 124 can be generated by storage control module 106 as audio/video content 110 is received.

Programming content index 124 includes multiple entries, each entry identifying both where a particular frame of programming content 122 is within a file storing programming content 122, and a time associated with that particular frame. The time refers to a time during playback of programming content 122 when that particular frame is to be played back. In one or more embodiments, the particular frames identified in index 124 are frames which can be displayed independently of other frames (the frames do not rely on data from other frames). Such frames are also referred to as I-frames in some implementations.

Similarly, advertising content 132 has a corresponding advertising content index 134. Index 134 can be embedded in advertising content 132 (such as in a header of content 132), can be included in a file corresponding to content 132, or can otherwise be associated with content 132. Index 134 can be pre-generated and sent to or otherwise obtained by storage control module 106, such as embedded in audio/video content 110 or received from the same source as advertising content 132 is received. Alternatively, index 134 can be generated by storage control module 106 as audio/video content 110 is received.

Advertising content index 134 includes multiple entries, each entry identifying both where a particular frame of advertising content 132 is within a file storing advertising content 132, and a time associated with that particular frame. The time refers to a time during playback of advertising content 134 when that particular frame is to be played back. In one or more embodiments, the particular frames identified in index 134 are frames which can be displayed independently of other frames and do not rely on data from other frames (e.g., I-frames in some implementations).

During playback of programming content 122, index 124 can be accessed to identify the frames in content 122 that can be displayed independently of other frames, and can select from these frames when playing back content 122 in a trick mode. Similarly, during playback of advertising content 132, index 134 can be accessed to identify the frames in content 132 that can be displayed independently of other frames, and can select from these frames when playing back content 132 in a trick mode. The use of these indexes 124 and 134 to facilitate playback of content 122 and 132 during trick mode playback is discussed in more detail below.

A single programming content 122 and programming content index 124 are illustrated in FIG. 1. In one or more embodiments, multiple programs are included in content 122.

Alternatively, a separate programming content 122 and index 124 can be included for each of multiple programs. Similarly, a single advertising content 132 and advertising content index 134 are illustrated in FIG. 1. In one or more embodiments, multiple ads are included in content 132. Alternatively, a separate advertising content 132 and index 134 can be included for each of multiple ads.

During operation, user control module 102 receives user input 140 to control playback of audio/video content 110. User input 140 can be received in a variety of different manners, such as via a remote control device, keys or buttons on device 100, verbal commands, and so forth. User input 140 can include, for example, requests to playback audio/video content at a normal playback speed (the normal speed at which the audio/video content is played back), requests to playback audio/video content in a trick mode, requests to pause playback of the audio/video content, and so forth.

The trick modes can take a variety of different forms, and each trick mode plays back the audio/video content in the forward or in the reverse direction. Each trick mode can also have a particular trick play speed or skip interval. Examples of forward direction trick modes include a fast-forward trick mode that plays back the audio/video content at a trick play speed that is faster than the normal playback speed, a slow motion trick mode that plays back the audio/video content at a trick play speed that is slower than the normal playback speed, and a skip forward trick mode that causes the audio/video content to jump or skip ahead to different sections of the audio/video content (e.g., these different sections can be defined in the audio/video content, can be at particular intervals such as every 30 seconds or every 5 minutes, etc.), and so forth. Examples of reverse direction trick modes include a rewind trick mode that plays back the audio/video content backwards at a trick play speed that is faster or slower than the normal playback speed (or a trick play speed that is the normal playback speed), and a skip back trick mode that causes the audio/video content to jump or skip backwards to different sections of the audio/video content (e.g., these different sections can be defined in the audio/video content, can be at particular intervals such as every 30 seconds or every 5 minutes, etc.), and so forth.

Content playback module 104 receives indications of user input 140 from user control module 102, and plays back audio/video content 110 (as received or from storage device 108) as content output 142 in accordance with the user input 140. During advertising segments, advertising content 132 is played back by module 104 in the same trick mode as the programming content is played back, as discussed in more detail below.

In one or more embodiments, device 100 plays back content output 142 (e.g., displays video content, plays back audio content, and so forth). In other embodiments device 100 generates one or more signals based on audio/video content 110 that are output to one or more other devices (e.g., televisions, projectors, speakers, etc.) which in turn display or otherwise present content output 142.

Playback of programming content and advertising content in a trick mode can be performed using a variety of different techniques. In one or more embodiments, fast-forward trick modes are implemented by skipping one or more frames of the programming content during playback of the content. For example, if the content were to be played back in a fast-forward mode at a trick play speed of five times the normal playback speed (also referred to as 5×), then every fifth frame can be played back rather than every frame. Similarly, rewind trick modes are implemented by playing back (and optionally skipping, based on the trick play speed) frames in reverse order. For example, if the content were to be played back in a rewind mode at a trick play speed of two times the normal playback speed (also referred to as 2×), then every other frame of the programming content can be played back in reverse order.

The indexes 124 and 134 are used by content playback module 104 to facilitate this playback of content in trick modes. For example, if programming content is being played back in a fast-forward trick mode at 5×, then every fifth entry in programming content index 124 can be accessed by module 104 to identify the frame to be displayed. By way of another example, if advertising content is being played back in a fast-forward trick mode at 20×, then every twentieth entry in advertising content index 134 can be accessed by module 104 to identify the frame to be displayed. By way of yet another example, if programming content is being played back in a skip forward mode with a skip interval of 30 seconds and there are 5 entries in index 124 per second of content, then every $150^{th}$ entry in programming content index 124 can be accessed by module 104 to identify the frame to be displayed.

When playing back content in a trick mode, situations can arise where a signal embedded in the programming content to identify an upcoming advertising segment is missed. For example, if the signal is embedded in a frame a particular amount of time before the advertising segment occurs, and if the content is being played back in a fast-forward trick mode at 5×, then the signal may be missed if only every fifth frame is being accessed and displayed.

Advertising segment record 114 is used by content playback module 104 to identify the advertising segments, and thus avoid situations where an embedded signal regarding an upcoming advertising segment is missed. Advertising segment record 114 is a record of where, during programming content, advertising segments occur. The advertising segment can be identified in different manners, such as a listing of playback or presentation times of programming content 122, a listing of offsets into programming content 122 or index 124, a listing of frames in programming content 122, a listing of entries in index 124, and so forth.

During playback of programming content, module 104 monitors record 114 to determine if an advertising segment is encountered. When an advertising segment is encountered, module 104 temporarily ceases playback of the programming content and plays back one or more advertisements. When the end of the advertising segment is encountered, module 104 resumes playback of the programming content at the speed the programming content was previously being played back at.

Module 104 typically plays back programming content and advertising content in the same trick mode and at the same trick play speed or skip interval. For example, if programming content is being played back in a fast-forward trick mode at 5×, then when an advertising segment is encountered the one or more ads are also played back in a fast-forward trick mode at 5×. Alternatively, different trick modes (or a normal mode) and/or trick play speeds can be used for playback of ads than is used for playback of the programming content.

Module 104 also uses advertising segment record 114 to determine a beginning location for playback of an ad during an advertising segment. When programming content is being played back in a trick mode, an amount of time (if any) of the advertising segment that was skipped while playing back the programming content is determined. This amount of time is then used as an offset into the ad content, with a beginning location for playback of the ad being a location that is the determined amount of time into the ad. The amount of time can be expressed in different manners, such as in a number of seconds (or fraction thereof), in a number of frames of content, and so forth.

For example, assume that an index file 124 for programming content includes identifiers of frames in the programming content 122 in numerical order beginning with frame 1: 1, 2, 3, 4, 5, etc. Similarly, assume that an index file 134 for advertising content includes identifiers of frames in the ad in numerical order beginning with frame 1: 1, 2, 3, 4, 5, etc. Further assume that the programming content is being played back in a fast-forward trick mode at 5×, so the following frames of the programming content are displayed: 1, 6, 11, 16, 21, 26, etc. Now, assume that advertising segment record 114 indicates that an advertising segment occurs at frame 18 during the programming content. So, module 104 plays back frames 1, 6, 11, and 16 of the programming content, but rather than playing back frame 21 of the programming content module 104 plays back a frame of the ad content. The amount of time of the advertising segment that was skipped while playing back the programming content is 21−18=3 frames. Accordingly, module 104 uses frame 4 of the ad as a beginning location for playback of the ad. Frame 4 is determined by adding the number of skipped frames to the beginning of the ad (which is frame 1 of the ad).

Alternatively, module 104 can use the beginning of the ad as the beginning location for playback of the ad during an advertisement segment.

It should be noted that situations can arise where a particular advertisement does not have a corresponding advertising content index 134 that supports trick mode playback. Such situations can be handled in different manners, such as selecting a different ad to be played back, playing back frames in accordance with some other technique (e.g., selecting a particular one or more frames from the ad in accordance with some other process or technique and playing back those frames, and do so forth).

In one or more embodiments, content playback module 104 selects one or more of multiple ads to be played back during an advertising segment. The particular one or more ads can be selected in a variety of different manners, such as randomly, based on an identification of a particular one or more ads in advertising segment data 112, in accordance with some other rules or criteria, and so forth. The ads can be obtained by module 104 from storage device 108 (e.g., advertising content 132), or alternatively can be obtained from other sources such as a server or other device, via a television channel, and so forth.

Figure 2:
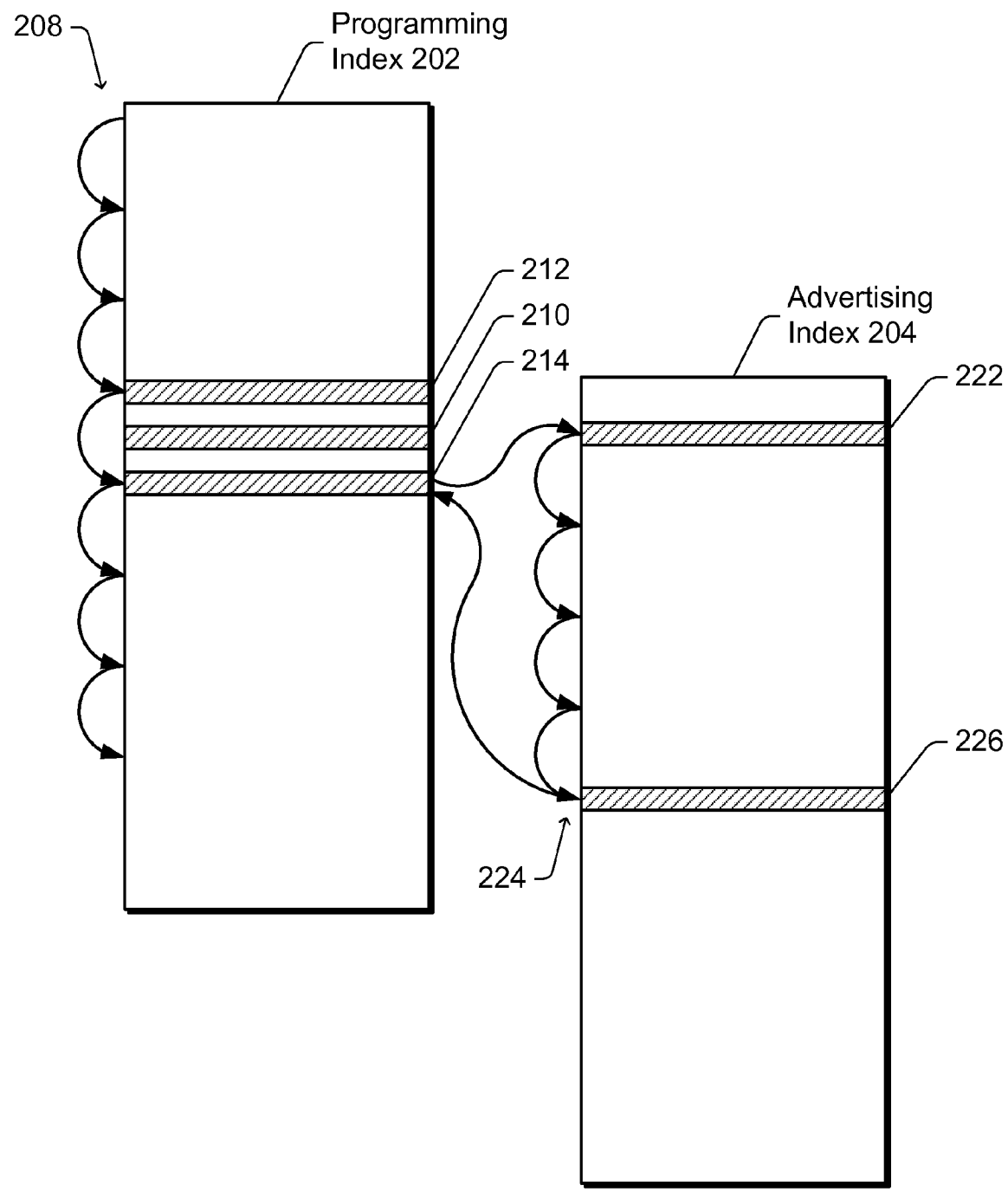
FIG. 2 illustrates an example of the client-side ad insertion during trick mode playback discussed herein in accordance with one or more embodiments.

FIG. 2 illustrates an example of the client-side ad insertion during trick mode playback discussed herein in accordance with one or more embodiments. In FIG. 2, a programming index 202 and an advertising index 204 are illustrated. Programming index 202 can be, for example, a programming content index 124 of FIG. 1, and advertising index 204 can be, for example, an advertising content index 134 of FIG. 1. Selected entries in indexes 202 and 204 are illustrated with cross-hatched boxes. FIG. 2 is discussed with reference to other components of FIG. 1.

During trick mode playback of programming corresponding to index 202, entries of index 202 are accessed to determine which frames of the corresponding programming to play back for the current trick mode. Content playback module 104 jumps from entry to entry in index 202 as illustrated by arrows 208. Concurrently, module 104 is monitoring advertising segment record 114 to determine if an advertising segment is encountered. In the example of FIG. 2, an advertising segment is encountered at the time in index 202 corresponding to entry 210.

The frame identified by entry 210 is skipped over for the current trick mode. Thus, module 104 plays back the frame identified by entry 212, then temporarily ceases playback of the programming content. Module 104 then jumps to play back one or more advertisements corresponding to advertising index 204.

As can be seen in FIG. 2, the advertising segment was to occur at the time corresponding to entry 210, but the entries from 210 to 214 were skipped over. Accordingly, part of the advertising segment was skipped over during playback of the programming content, and module 104 thus selects a beginning entry 222 in index 204 that is offset into index 204. The amount of this offset is the same (or approximately the same) as the part of the advertising segment that was skipped over during playback of the programming content. For example, if three entries in index 202 were skipped, then the offset into index 204 is three entries.

During playback of one or more ads corresponding to index 204, entries of index 204 are accessed to determine which frames of the corresponding ad to play back for the current trick mode. Content playback module 104 jumps from entry to entry in index 204 as illustrated by arrows 224. Module 104 continues playing back frames corresponding to entries in index 204 until the end of the advertising segment is encountered. The end of the advertising segment can be determined in different manners, such being the end of advertising index 204, being identified in advertising segment record 114, and so forth.

In the example of FIG. 2, the ending of the advertising segment is encountered at the time in index 204 corresponding to entry 226. Module 104 then resumes playback of the programming content at the frame corresponding to the next entry in index 202 that would have been played back if module 104 had not temporarily ceased playback of the programming content. In the example of FIG. 2, this frame is the frame corresponding to entry 214 in index 202.

Thus, as can be seen in FIG. 2, the trick mode being used to playback the programming content is maintained when the advertising content is played back. Additionally, when playback of the programming content resumes, the playback resumes using the same trick mode.

In the example of FIG. 2, only one advertising index 204 is illustrated. It is to be appreciated that if multiple ads corresponding to different advertising indexes are played back during the same advertising segment, then module 104 can use the multiple advertising indexes sequentially to identify the frames to be played back for the current trick mode.

Figure 3:
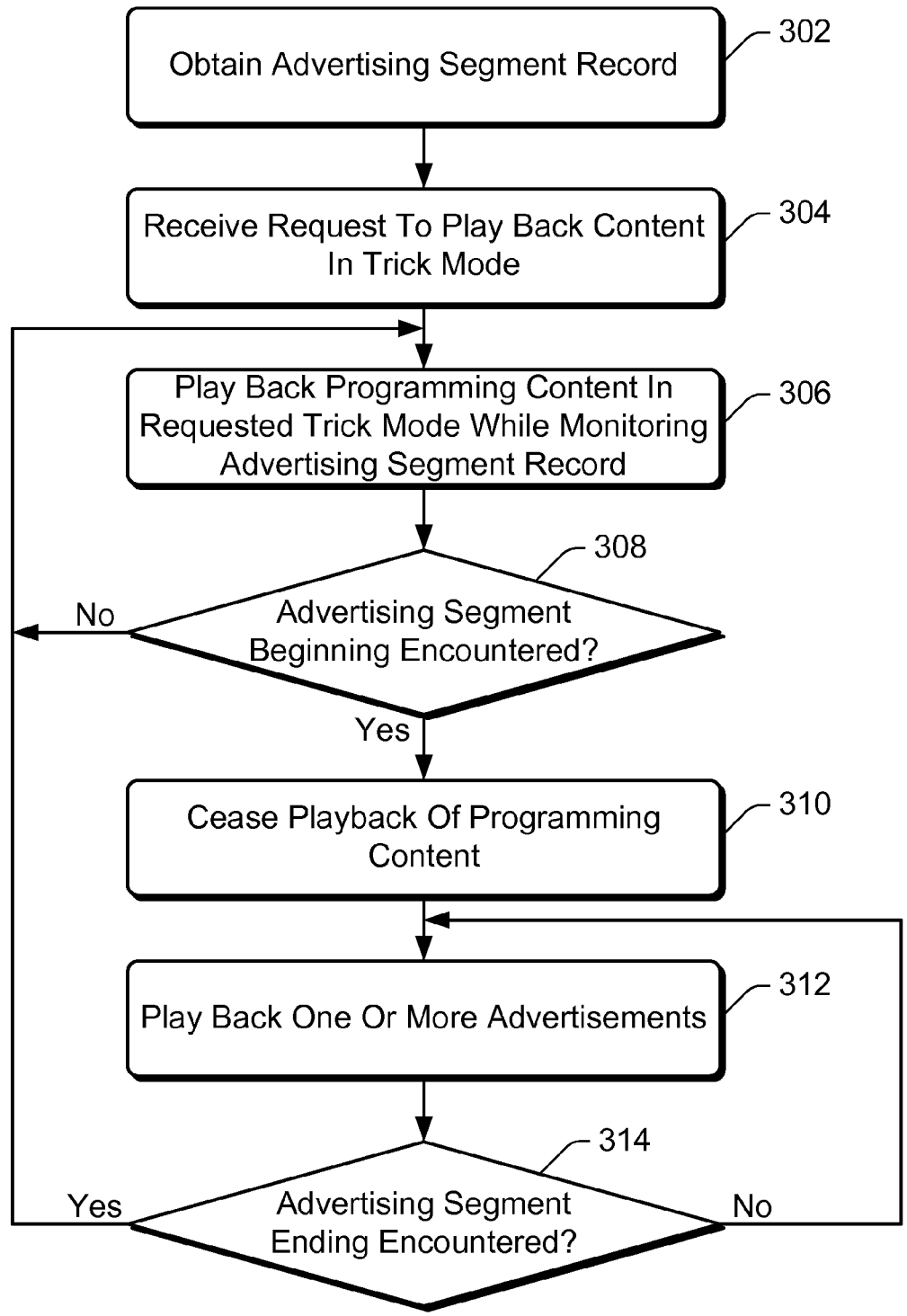
FIG. 3 is a flowchart illustrating an example process for client-side ad insertion during trick mode playback in accordance with one or more embodiments.

FIG. 3 is a flowchart illustrating an example process 300 for client-side ad insertion during trick mode playback in accordance with one or more embodiments. Process 300 is carried out by a device, such as device 100 of FIG. 1, and can be implemented in software, firmware, hardware, or combinations thereof. Process 300 is an example process for client-side ad insertion during trick mode playback; additional discussions of client-side ad insertion during trick mode playback are included herein with reference to different figures.

In process 300, an advertising segment record is obtained (act 302). As discussed above, this advertising segment record can be pre-generated by another component or device and communicated to the device implementing process 300, or alternatively can be generated by the device implementing process 300.

A request to play back content in a trick mode is received (act 304). This request can be a user request as discussed above, or alternatively can be a request from another component or module.

The programming content is played back in the requested trick mode (act 306). As discussed above, this trick mode playback can be performed using a variety of different techniques.

Playback of the programming content in the requested trick mode continues until a beginning of an advertising segment is encountered (act 308). The locations of advertising segments are identified using the advertising segment record as discussed above.

In response to the advertising segment beginning being encountered, playback of the programming content temporarily ceases (act 310). Instead of playing back the programming content, one or more ads are played back (act 312). These one or more ads are played back in the same trick mode as the programming content was being played back (the trick mode requested in act 304), including the same trick play speed or skip interval. Playback of the one or more ads begins with a beginning location of a first ad of the one or more ads. This beginning location can be the beginning of the ad, or an offset into the ad based on an amount of time of the advertising segment that was skipped while playing back the programming content as discussed above.

Playback of the ad content in the requested trick mode continues until a ending of the advertising segment is encountered (act 314). In response to the ending of the advertising segment being encountered, playback of the programming content in the requested trick mode resumes (act 306).

Figure 4:
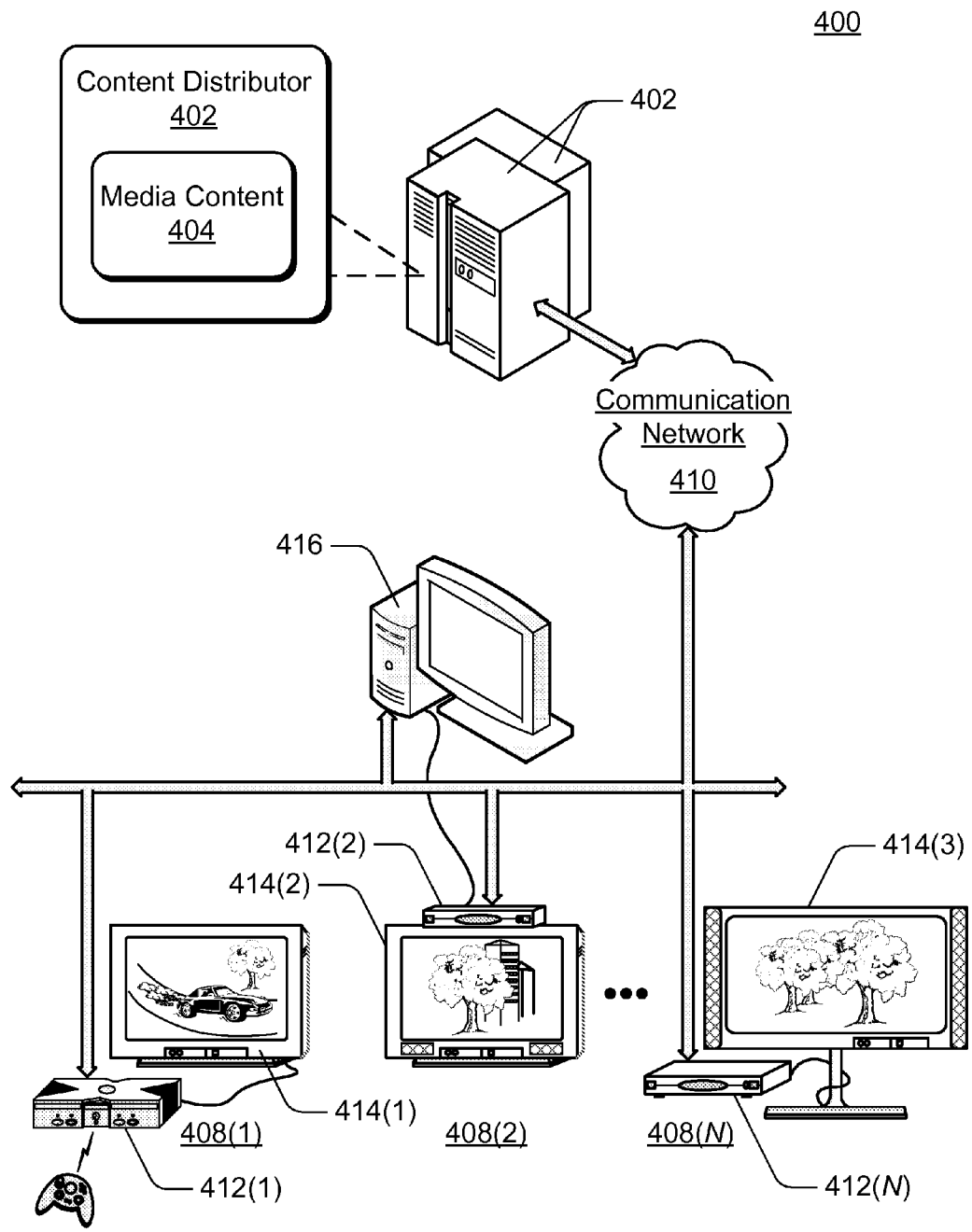
FIG. 4 illustrates an example system in which one or more embodiments of the client-side ad insertion during trick mode playback can be implemented.

FIG. 4 illustrates an example system 400 in which one or more embodiments of the client-side ad insertion during trick mode playback can be implemented. System 400 includes one or more content distributors 402 that communicate media content 404 (such as audio/video content 110 of FIG. 1) to any number "N" of various television client systems 408(1-N) via a communication network 410. Client systems 408 can each be, for example, a different type (or alternatively the same types) of device 100 of FIG. 1. Communication network 410 can be implemented to include an Internet Protocol (IP) based network that facilitates media content distribution and data communication between the content distributor(s) 402 and any number of television client devices.

Each of client systems 408(1-N) includes a respective television client device 412(1-N) and a respective display device 414(1-N), such as any type of television, monitor, LCD, projector, or similar television-based display system that renders audio, video, and/or image data. Any of client devices 412(1-N) can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device. Any of television client devices 412(1-N) may also be associated with a user (e.g., a person) and/or an entity that operates a client device such that a television client device describes logical clients that include users, software, and/or devices. In this example of FIG. 4, client device 412(2) is a television set-top box that is connected, or otherwise communicatively linked, to a computing device 416.

Any of television client devices 412(1-N) of the respective client systems 408(1-N) can be implemented with one or more processors, a communication module, memory components, a media content rendering system, and a content retrieval module. Additionally, each of television client devices 412(1-N) can be configured for communication with any number of different content distributors 402 to receive any type of media content 404 via the communication network 410. Further, any of the television client devices 412(1-N) can be implemented with any number and combination of differing components as further described with reference to the example client device shown in FIG. 5.

Figure 5:
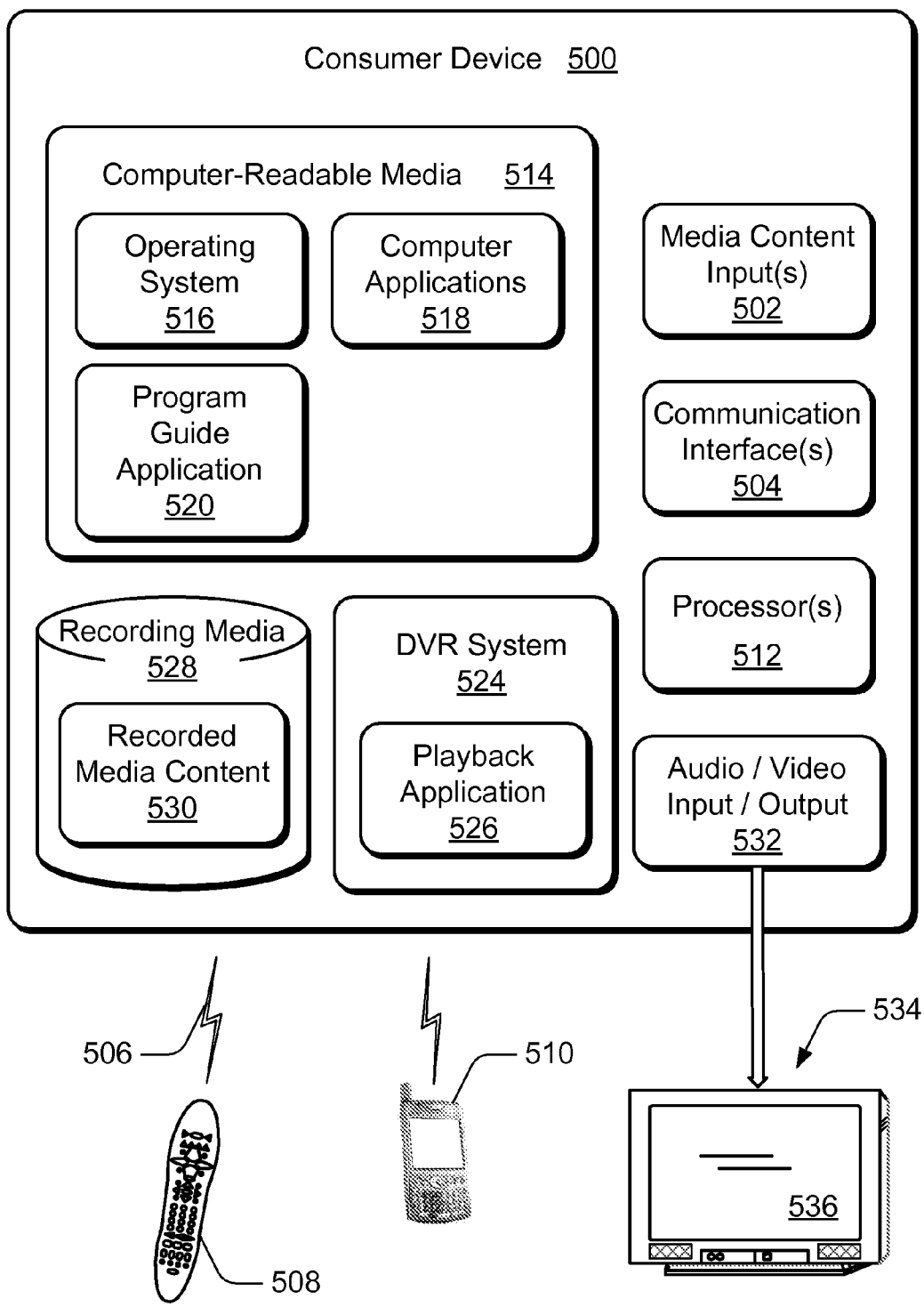
FIG. 5 illustrates various components of an example consumer device that can be implemented as any form of a computing, electronic, or television client device to implement one or more embodiments of the client-side ad insertion during trick mode playback.

FIG. 5 illustrates various components of an example consumer device 500 that can be implemented as any form of a computing, electronic, or television client device to implement one or more embodiments of the client-side ad insertion during trick mode playback. For example, consumer device 500 can be implemented as a device 100 shown in FIG. 1, and/or as any of the client devices 412(1-N) of client systems 408(1-N) shown in FIG. 4. In various embodiments, consumer device 500 can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device.

Consumer device 500 includes one or more media content inputs 502 that may include IP inputs over which streams of media content are received via an IP-based network. Consumer device 500 further includes communication interface(s) 504 that can be implemented as any one or more of a serial and/or parallel interface, a wireless interface, any type of network interface, a modem, and as any other type of communication interface. A wireless interface enables client device 500 to receive control input commands 506 and other information from an input device, such as from remote control device 508, a portable computing-based device (such as a cellular or other wireless phone) 510, or from another infrared (IR), 802.11, Bluetooth, or similar RF input device.

A network interface provides a connection between consumer device 500 and a communication network by which other electronic and computing devices can communicate data with device 500. Similarly, a serial and/or parallel interface provides for data communication directly between client device 500 and the other electronic or computing devices. A modem facilitates client device 500 communication with other electronic and computing devices via a conventional telephone line, a DSL connection, cable, and/or other type of connection.

Consumer device 500 also includes one or more processors 512 (e.g., any of microprocessors, controllers, and the like) which process various computer-executable instructions to control the operation of device 500, to communicate with other electronic and computing devices, and to implement embodiments of the client-side ad insertion during trick mode playback. Consumer device 500 can be implemented with computer-readable media 514, such as one or more memory components, examples of which include random access memory (RAM), nonvolatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD) or DVD, and the like.

Computer-readable media 514 provides data storage mechanisms to store various information and/or data such as software applications and any other types of information and data related to operational aspects of consumer device 500. For example, an operating system 516 and/or other computer applications 518 can be maintained as software applications with the computer-readable media 514 and executed on processor(s) 512 to implement embodiments of the client-side ad insertion during trick mode playback.

Consumer device 500 can also include a program guide application 520 that is implemented to process program guide data and generate program guides for display. A program guide enables a viewer to navigate through an onscreen display and locate various media content such as broadcast programs, recorded programs, video on demand programs and movies, interactive game selections, network-based applications, and other media content of interest to the viewer. Other modules, such as a content retrieval module, can also be included in consumer device 500, or alternatively incorporated into other components or modules of consumer device 500.

Consumer device 500 can also include a DVR system 524 with playback application 526, and recording media 528 to maintain recorded media content 530 (which can be programming content and/or advertising content) that consumer device 500 receives and/or records. Further, consumer device 500 may access or receive additional recorded media content that is maintained with a remote data store (not shown). Consumer device 500 may also receive media content from a video on demand server, or media content that is maintained at a broadcast center or content distributor that distributes the media content to subscriber sites and client devices. Playback application 526 is a video control application that can be implemented to control the playback of media content, the recorded media content 530, and/or other video on demand media content, music, and any other audio, video, and/or image media content which can be rendered and/or displayed for viewing. Playback application 526 can optionally implement content playback module 104, or alternatively module 104 can be implemented by another component or module (such as audio/video input/output 532).

Consumer device 500 also includes an audio and/or video output 532 that provides audio and/or video data to an audio rendering and/or display system 534. Audio rendering and/or display system 534 can include any devices that process, display, and/or otherwise render audio, video, and image data. Video signals and audio signals can be communicated from consumer device 500 to a display device 536 via an RF (radio frequency) link, S-video link, composite video link, component video link, DVI (digital video interface), analog audio connection, or other similar communication link. Alternatively, audio rendering and/or display system 534 can be implemented as integrated components of the example consumer device 500. Consumer device 500 along with the audio rendering and/or display system 534 is an example of a viewing system that can be implemented in a household viewing area for viewing television programs and/or receiving other television media content.

Figure 6:
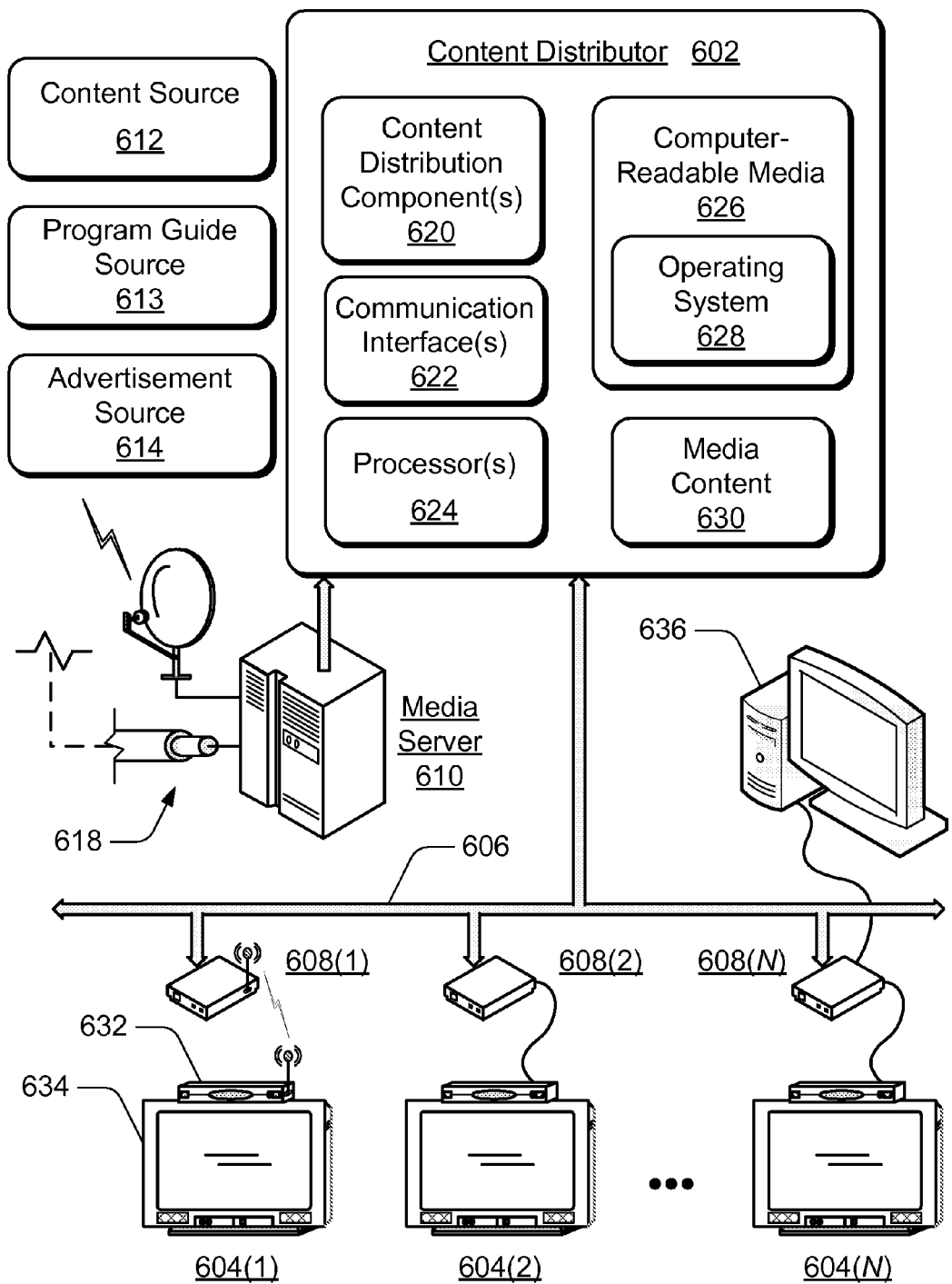
FIG. 6 illustrates an example entertainment and information system in which one or more embodiments of the client-side ad insertion during trick mode playback can be implemented.

FIG. 6 illustrates an example entertainment and information system 600 in which one or more embodiments of the client-side ad insertion during trick mode playback can be implemented. System 600 facilitates the distribution of media content, program guide data, and advertising content to multiple viewers and to multiple viewing systems. System 600 includes a content distributor 602 and any number "N" of client systems 604(1-N) each configured for communication via a communication network 606. Each client system 604(1-N) is an example of the client systems 408(1-N) described with reference to FIG. 4. Each of the client systems 604(1-N) can receive data streams of media content, media content, program guide data, advertising content, closed captioning data, other content, and the like from content server(s) of content distributor 602 via communication network 606.

Communication network 606 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 606 can be implemented using any type of network topology and any network communication protocol, and can be represented or otherwise implemented as a combination of two or more networks. A digital network can include various hardwired and/or wireless links 608(1-N), routers, gateways, and so on to facilitate communication between content distributor 602 and client systems 604(1-N).

System 600 includes a media server 610 that receives programming content from a content source 612, program guide data from a program guide source 613, and advertising content from an advertisement source 614. In one or more embodiments, media server 610 represents an acquisition server that receives the audio and video media content from content source 612, an EPG server that receives the program guide data from program guide source 613, and/or an advertising management server that receives the advertising content from the advertisement source 614.

Content source 612, program guide source 613, and advertisement source 614 control distribution of the media content, the program guide data, and at least some of the advertising content to the media server 610 and/or to other servers. The media content, program guide data, and advertising content can be distributed via various transmission media 618, such as satellite transmission, radio frequency transmission, cable transmission, and/or via any number of other wired or wireless transmission media. In this example, media server 610 is shown as an independent component of system 600 that communicates the media content, program guide data, advertising content, and content descriptions to content distributor 602. In an alternate implementation, media server 610 can be implemented as a component of content distributor 602.

Content distributor 602 is representative of a headend service in a content distribution system, for example, that provides the media content, program guide data, advertising content, and content descriptions to multiple subscribers (e.g., the client systems 604(1-N)). Content distributor 602 can be implemented as a satellite operator, a network television operator, a cable operator, and the like to control distribution of media content, program and advertising content, and content descriptions, such as movies, television programs, commercials, music, and other audio, video, and/or image content to client systems 604(1-N).

Content distributor 602 includes various content distribution components 620 to facilitate media content processing and distribution, such as a subscriber manager, a device monitor, and one or more content servers. The subscriber manager manages subscriber data, and the device monitor monitors client systems 604(1-N) (e.g., and the subscribers), and maintains monitored client state information.

Although the various managers, servers, and monitors of content distributor 602 (to include media server 610 in one or more embodiments) are described as distributed, independent components of content distributor 602, any one or more of the managers, servers, and monitors can be implemented together as a multi-functional component of content distributor 602. Additionally, any one or more of the managers, servers, and monitors described with reference to system 600 can implement features and embodiments of the client-side ad insertion during trick mode playback.

Content distributor 602 includes communication interface(s) 622 that can be implemented as any type of interface to communicate and receive data from client devices of the television system. Content distributor 602 also includes one or more processors 624 (e.g., any of microprocessors, controllers, and the like) which process various computer-executable instructions to control the operation of content distributor 602. Content distributor 602 can be implemented with computer-readable media 626 which provides data storage to maintain software applications such as an operating system 628 and media content 630 for distribution to the client systems 604(1-N).

Client systems 604(1-N) can each be implemented to include a client device 632 and a display device 634 (e.g., a television, LCD, and the like). A client device 632 of a respective client system 604 can be implemented in any number of embodiments, such as a set-top box, a digital video recorder (DVR) and playback system, an appliance device, a gaming system, and as any other type of client device that may be implemented in an entertainment and information system. In an alternate embodiment, client system 604(N) is implemented with a computing device 636 as well as a client device. The computing device 636 is an example of a connected data store that can record and maintain media content for a client device. Additionally, any client device 632 of a respective client system 604 can implement features and embodiments of the client-side ad insertion during trick mode playback as described herein.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer-readable memory devices. The features of the client-side ad insertion during trick mode playback described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
playing back programming content in a trick mode while monitoring an advertising segment record associated with an advertising segment;
ceasing playback of the programming content when a beginning of the advertising segment is encountered, the beginning of the advertising segment being identified by the advertising segment record;
determining a number of skipped frames of the advertising segment that were skipped while playing back the programming content in the trick mode by subtracting a frame position of the programming content corresponding to the beginning of the advertisement segment from a frame position of the programming content at which the playback of the programming content is ceased;
determining a beginning playback location for the advertising segment by adding the number of skipped frames to the beginning of the advertising segment;
playing back, from the beginning playback location, one or more advertisements during the advertising segment; and
resuming playback of the programming content in the trick mode after an ending of the advertising segment is encountered.

2. A method as recited in claim 1, further comprising generating the advertising segment record as the programming content is received from a source.

3. A method as recited in claim 2, wherein the generating the advertising segment record comprises:
identifying multiple signals in the programming content as the programming content is received from the source, each of the multiple signals indicating an upcoming advertising segment; and
storing in the advertising segment record, for each of the multiple signals, an indication of when the upcoming advertising segment occurs.

4. A method as recited in claim 1, further comprising playing back each of the one or more advertisements in the trick mode.

5. A method as recited in claim 1, wherein the advertising segment record comprises a table identifying when during playback of the programming content the advertising segment occurs.

6. A method as recited in claim 5, wherein the table is embedded in the programming content.

7. A method as recited in claim 1, wherein playing back the one or more advertisements comprises:
obtaining each of the one or more advertisements from a local storage device; and
playing back each of the one or more advertisements in the trick mode.

8. A method as recited in claim 1, wherein determining the number of skipped frames of the advertising segment that were skipped is based at least in part on the trick mode and the advertising segment record.

9. A computing device comprising:
a storage device to store an advertising segment record that identifies when an advertising segment occurs during programming content; and
a content playback module, coupled to the content storage device, to:
play back the programming content in a trick mode while monitoring the advertising segment record;
cease playback of the programming content when the advertising segment occurs;
determine a number of skipped frames of the advertising segment that were skipped while playing back the programming content in the trick mode, the number of skipped frames comprising a difference between a frame position of the programming content at which the playback of the programming content was ceased and a frame position corresponding to a beginning of the advertising segment;
determine a beginning playback location for the advertising segment by adding the number of skipped frames to the beginning of the advertising segment;
play back, from the beginning playback location, one or more advertisements during the advertising segment; and
resume playback of the programming content in the trick mode after the end of the advertising segment.

10. A computing device as recited in claim 9, wherein the content playback module is further to generate the advertising segment record as the programming content is received from a source.

11. A computing device as recited in claim 10, wherein to generate the advertising segment record is to:

identify multiple signals in the programming content as the programming content is received from the source, each of the multiple signals indicating an upcoming advertising segment; and store in the advertising segment record, for each of the multiple signals, an indication of when the upcoming advertising segment occurs.

12. A computing device as recited in claim 9, wherein the content playback module is further to play back each of the one or more advertisements in the trick mode.

13. A computing device as recited in claim 9, wherein the advertising segment record comprises a table identifying when during playback of the programming content the advertising segment occurs.

14. A computing device as recited in claim 13, wherein the table is embedded in the programming content.

15. A computing device as recited in claim 9, wherein to play back the one or more advertisements is to:

obtain each of the one or more advertisements from a server; and play back each of the one or more advertisements in the trick mode.

16. A computing device as recited in claim 9, wherein to determine the number of skipped frames of the advertising segment is based at least in part on the trick mode and the advertising segment record.

17. One or more computer-readable storage media, the one or more computer-readable storage media not comprising a signal, the one or more computer-readable storage media comprising multiple instructions stored thereon that, responsive to execution by one or more processors of a device, cause the one or more processors to perform a method comprising:

generating an advertising segment record as programming content is received from a source and recorded by the device, the advertising segment record identifying when an advertising segment occurs during the programming content;

playing back the programming content in a trick mode while monitoring the advertising segment record;

ceasing playback of the programming content when a beginning of the advertising segment is encountered;

playing back, during the advertising segment, one or more advertisements in the trick mode starting at a beginning location of a first advertisement of the one or more advertisements, the beginning location being an amount of time after a beginning of the first advertisement, the amount of time being identified as a difference between a frame position of the programming content at which the playback of the programming content was ceased and a frame position corresponding to the beginning of the advertising segment; and resuming playback of the programming content in the trick mode after an ending of the advertising segment is encountered.

18. One or more computer-readable storage media as recited in claim 17, wherein the amount of time is identified, based on an index file associated with the programming content, as a number of frames of the advertising segment that were skipped during playback of the programming content.

\* \* \* \* \*